(12) United States Patent
Onishi et al.

(10) Patent No.: US 6,473,550 B1
(45) Date of Patent: Oct. 29, 2002

(54) OPTICAL FIBER TRANSMISSION-LINE

(75) Inventors: Masashi Onishi, Yokohama (JP);
Eisuke Sasaoka, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/126,608

(22) Filed: Apr. 22, 2002

Related U.S. Application Data

(63) Continuation of application No. 09/637,872, filed on Aug. 15, 2000, now Pat. No. 6,377,740.

(30) Foreign Application Priority Data

Sep. 27, 1999 (JP) ............................................ 11-272679

(51) Int. Cl.[7] .............................. G02B 6/02; G02B 6/16
(52) U.S. Cl. ........................ 385/123; 385/124; 385/125; 385/127
(58) Field of Search ................. 385/122–127; 359/161

(56) References Cited

U.S. PATENT DOCUMENTS

| | | | |
|---|---|---|---|
| 5,764,841 A | 6/1998 | Iwatsuki et al. | 385/123 |
| 5,887,105 A | 3/1999 | Bhagavatula et al. | 385/123 |
| 5,894,537 A | 4/1999 | Berkey et al. | 385/123 |
| 6,044,191 A | 3/2000 | Berkey et al. | 385/123 |
| 6,307,985 B1 | 10/2001 | Murakami et al. | 385/24 |
| 6,374,027 B1 * | 4/2002 | Onishi et al. | 385/123 |
| 6,404,964 B1 * | 6/2002 | Bhagavatula et al. | 385/123 |

OTHER PUBLICATIONS

Novel Fibers for Dispersion Managed High–Bit–Rate–Systems, V.A. Bhagavatula et al., Third Optoelectronics and Communications Conference (OECC'98) Technical Digest, Jul. 1998, Makuhari Messe., pp. 362–363.

"Methods of constructing a long–haul soliton transmission system with fibers having distribution in dispersion", Apr. 1, 1995, vol. 20, No. 7, Optics Letters, pp. 701–703.

Yutaka Miyamoto et al, "1.04–Tbit/s DWDM Transmission Experiment Based On Alternate–Polarization 80–Gbit/s OTDM Signals", *ECOC'98*, No. 20–24, Sep. 1998, Madrid, Spain, pp. 55 & 57.

* cited by examiner

*Primary Examiner*—Brian Healy
*Assistant Examiner*—Kevin S Wood
(74) *Attorney, Agent, or Firm*—McDermott, Will & Emery

(57) ABSTRACT

A dispersion-managed optical fiber transmission-line with which the formation of side bands around the optical signal wavelength can be suppressed even when carrying out high-speed signal transmission. An optical fiber transmission-line 1 constitutes one repeater span installed between a transmitter (or repeater) 2 and a receiver (or repeater) 3 and is made up of N sections $4_1$ through $4_N$ in sequence from the transmitter 2 to the receiver 3. The chromatic dispersion at the wavelength 1.55 μm is positive in the sections $4_n$ where the value of n is odd and is negative in the sections $4_n$ where the value of n is even. The ratio between the maximum value and the minimum value of the average chromatic dispersions $D_n$ of the sections $4_n$ is at least 1.3 and not greater than 10.0.

4 Claims, 4 Drawing Sheets

OPTICAL FIBER TRANSMISSION-LINE

RELATED APPLICATIONS

This application is a continuation of U.S. application Ser. No. 09/637,872, filed Aug. 15, 2000, now U.S. Pat. No. 6,377,740.

BACKGROUND OF THE INVENTION

1. Field of the Invention

This invention relates to an optical fiber transmission-line for transmitting multiple wavelength optical signals in a wavelength division multiplexing transmission system.

2. Related Background Arts

A wavelength division multiplexing (WDM) transmission system can effect high speed, high capacity optical communication by transmitting multiple wavelength optical signals. Because the transmission loss of a silica optical fiber used as an optical fiber transmission-line is small around the wavelength 1.55 $\mu$m, and optical amplifiers for amplifying optical signals in the wavelength 1.5 $\mu$m band are available, multiple wavelength optical signals in the wavelength 1.55 $\mu$m band are used in WDM transmission systems.

When in an optical fiber transmission-line for transmitting multiple wavelength optical signals there is chromatic dispersion in the optical signal wavelength band, the pulse waveform of the optical signal collapses and transmission quality deteriorates. Therefore, from this point of view, it is desirable for the chromatic dispersion in the optical signal wavelength band to be small. On the other hand, when the chromatic dispersion in the optical signal wavelength band is substantially zero, the nonlinear optical phenomenon of four-wave mixing tends to occur, crosstalk and noise arise, and transmission quality deteriorates. The occurrence of four-wave mixing can be suppressed by making repeater spans short and reducing optical signal power, but because this makes it necessary to provide many optical amplifiers, it results in a generally expensive optical transmission system.

To deal with such problems, dispersion-management has been proposed, wherein sections where the chromatic dispersion at the wavelength 1.55 $\mu$m is positive and sections where it is negative are provided alternately in the longitudinal direction of the optical fiber transmission-line. If this kind of optical fiber transmission-line is used, by making the average chromatic dispersion in the optical fiber transmission-line as a whole substantially zero, it is possible to suppress transmission quality deterioration caused by chromatic dispersion. And because at most points in the optical fiber transmission-line the absolute value of the chromatic dispersion is not in the vicinity of zero, it is thought to be possible also to suppress transmission quality deterioration caused by four-wave mixing (see for example U.S. Pat. Nos. 5,894,537 or 5,887,105).

However, the present inventors have recognized that in this related art technology, when high-speed signal transmission with a bit rate exceeding 10 Gb/s is carried out using an optical fiber transmission-line wherein the alternating disposition of the sections where the chromatic dispersion is positive and the sections where it is negative is regular, side bands form around the original wavelength of the optical signal. This formation of side bands appears to be caused by the interaction in the same pattern between the optical signal spectrum and the chromatic dispersion as a result of the regularity of the alternating disposition. And because this formation of side bands constitutes a cause of transmission quality deterioration, it is important that it be suppressed.

SUMMARY OF THE INVENTION

It is therefore an object of the present invention to provide a dispersion-managed optical fiber transmission-line with which the formation of side bands around the optical signal wavelength can be suppressed even when carrying out high-speed signal transmission.

To achieve this object, a first optical fiber transmission-line according to the invention is an optical fiber transmission-line forming a single repeater span in which sections where the chromatic dispersion at a predetermined wavelength is positive and sections where it is negative are provided alternately, wherein the ratio between the maximum value and the minimum value among the absolute values of the average chromatic dispersions of the sections is not less than 1.3 and not greater than 10.0.

A second optical fiber transmission-line according to the invention is an optical fiber transmission-line forming a single repeater span in which sections where the chromatic dispersion at a predetermined wavelength is positive and sections where it is negative are provided alternately, wherein the number of sections of which the absolute value of the average chromatic dispersion differs by not less than 10% from that of an adjacent section is at least half of the total number of sections.

A third optical fiber transmission-line according to the invention is an optical fiber transmission-line forming a single reperter span in which sections where the chromatic dispersion at a predetermined wavelength is positive and sections where it is negative are provided alternately, wherein the number of sections of which the absolute value of the average chromatic dispersion differs by not less than 0.5 ps/nm/km from that of an adjacent section is at least half of the total number of sections.

A fourth optical fiber transmission-line according to the invention is an optical fiber transmission-line forming a single repeater span in which sections where the chromatic dispersion at a predetermined wavelength is positive and sections where it is negative are provided alternately, wherein for any two sections the absolute value of the average chromatic dispersion of the section nearer the optical signal input end of the repeater span is larger than the absolute value of the average chromatic dispersion of the section nearer the optical signal output end and the absolute value of the average chromatic dispersion of the section at the output end is not less than 1 ps/nm/km. For any two sections in this. fourth optical fiber transmission-line, the length of the section nearer the optical signal input end of any repeater span is preferably shorter than the length of the section nearer the optical signal output end.

With any of the first through fourth optical fiber transmission-lines described above, the formation of side bands around the optical signal wavelength can be suppressed even when carrying out high-speed signal transmission, and even when carrying out high-speed signal transmission with a bit rate exceeding 10 Gb/s it is possible to realize WDM transmission of good transmission quality.

Also, with the fourth optical fiber transmission-line described above, it is not necessary for the sign of the chromatic dispersion to be frequently alternated in regions where the absolute value of the chromatic dispersion is large, and the manufacturing productivity of the optical fiber transmission-line is thereby improved.

And, in each of the first through fourth optical fiber transmission-lines described above, when the length of each section is not less than 0.1 km and not more than 10 km, the cumulative chromatic dispersion does not become large, so the deterioration of transmission quality caused by the interaction of cumulative chromatic dispersion and nonlinear optical phenomena can be suppressed. When the absolute value of the average chromatic dispersion of each section is at least 1 ps/nm/kn, transmission quality deterioration caused by nonlinear optical phenomena can be suppressed. When the absolute value of the average chromatic dispersion of the whole repeater span is 0.5 ps/nm/km or less, transmission quality deterioration caused by cumulative chromatic dispersion can be suppressed. When the polarization mode dispersion of the whole repeater span is not greater than 0.2 ps/km$^{1/2}$, transmission quality deterioration caused by polarization mode dispersion can be suppressed. When the transmission loss is not more than 0.3 dB/km, the distance of a transmission line without repeaters can be made greater. And when the effective core area is at least 20 $\mu$m$^2$ over the whole repeater span, transmission quality deterioration caused by nonlinear optical phenomena can be suppressed.

In this invention, a "predetermined wavelength" means the center wavelength of an optical signal wavelength band, for example, 1.55 $\mu$m. And, when not otherwise specified, values of polarization mode dispersion, transmission loss and effective core area are values at the predetermined wavelength.

The above and further objects and novel features of the invention will be more fully clarified from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

In order to more fully understand the drawings used in the detailed description of the present invention, a brief description of each drawing is provided.

DETAILED DESCRIPTION OF THE PREFERRED EMBODIMENTS

Figure 1:
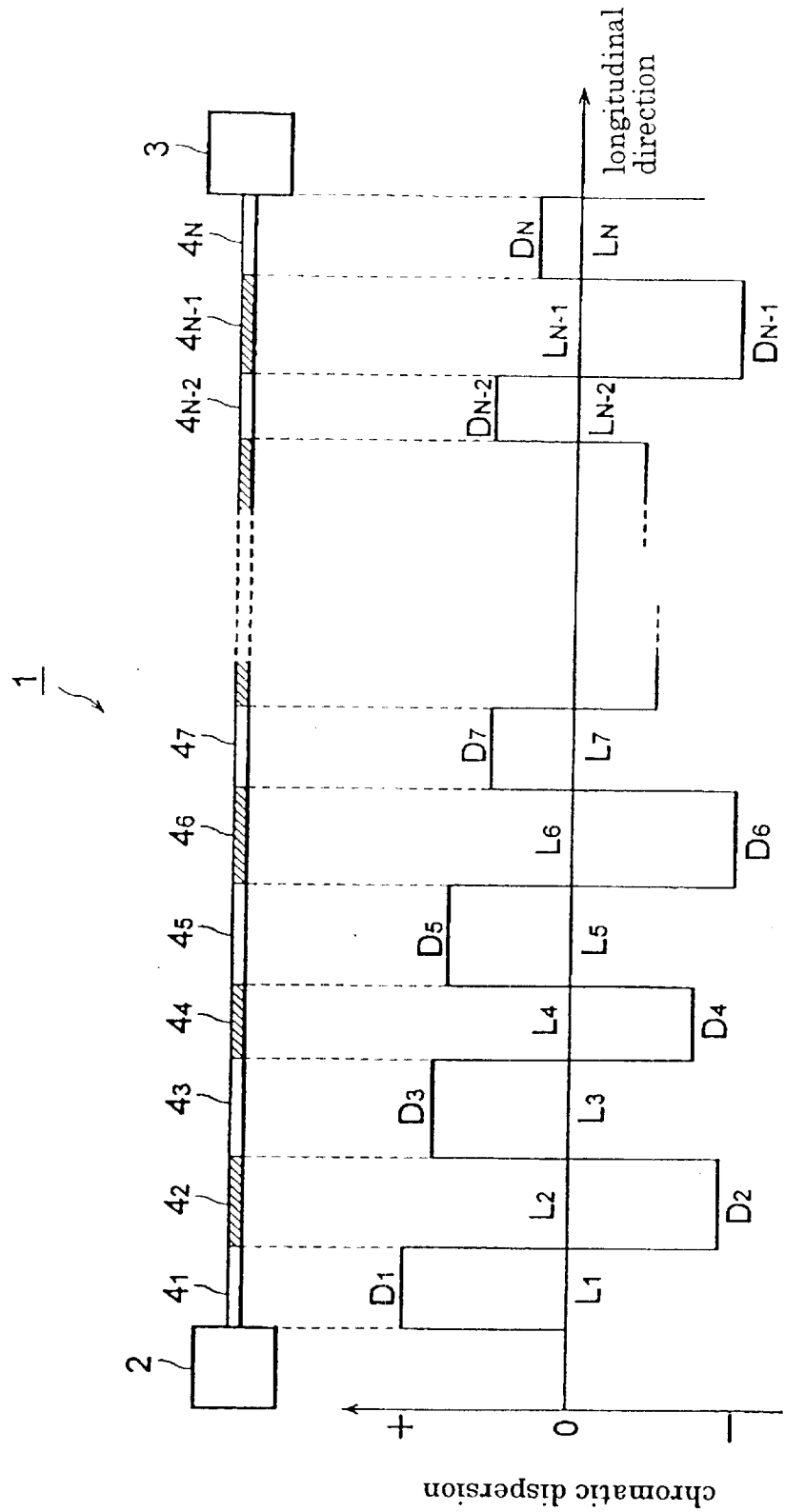
FIG. 1 is a schematic view illustrating an optical fiber transmission-line according to any of first, second and third preferred embodiments.

In the following, the preferred embodiments of the present invention will be explained in detail with reference to the accompanying drawings. To facilitate comprehension of the explanation, the same reference numerals denote the same parts, where possible, throughout the drawings, and a repeated explanation will be omitted. The dimensions in the drawings are partly exaggerated and do not always correspond to actual ratios of dimensions.

(First Preferred Embodiment)

A first preferred embodiment of an optical fiber transmission-line according to the invention will now be described. FIG. 1 is a view illustrating an optical fiber transmission-line 1 according to this first preferred embodiment. This optical fiber transmission-line 1 constitutes one repeater span installed between a transmitter (or repeater) 2 and a receiver (or repeater) 3, and is made up of N(N$\geq$2) sections 4$_1$ through 4$_N$ in sequence from the transmitter 2 to the receiver 3. At a predetermined wavelength the chromatic dispersion is positive in the sections 4$_n$ where the value of n is odd and is negative in the sections 4$_n$ where the value of n is even.

The optical fiber transmission-line 1 may be made by connecting together section by section with optical fibers having predetermined chromatic dispersions, or the whole repeater span may be made from a single optical fiber. In the latter case, the optical fiber transmission-line 1 can be obtained, for example, by the diameter of a core region being modulated to vary the chromatic dispersion while the diameter of the cladding region is kept constant along the longitudinal direction. In this case the optical fiber transmission-line 1 can be manufactured by making a preform in which the diameter of a core part varies in the longitudinal direction and the diameter of the cladding part is fixed in the longitudinal direction and drawing from this preform an optical fiber whose cladding diameter is fixed. Or, the optical fiber transmission-line 1 can be obtained by the diameter of the core region and the diameter of the cladding region being modulated to adjust the chromatic dispersion in the longitudinal direction. In this case the optical fiber transmission-line 1 can be manufactured by making a preform in which the respective diameters of the core part and the cladding part are fixed in the longitudinal direction and varying the cladding diameter in the longitudinal direction while drawing an optical fiber from this preform. In either case, the larger the diameter of the core region is, the larger the chromatic dispersion can be made.

The average chromatic dispersion of a section 4$_n$ will be written D$_n$. Also, the maximum value among the absolute values of D$_n$ will be written Dmax, and the minimum value among the absolute values of D$_n$ will be written Dmin. It is a characteristic feature of this preferred embodiment that the ratio R=Dmax/Dmin is at least 1.3 and not more than 10.

If R is at least 1.3, then even when carrying out high-speed signal transmission it is possible to suppress the formation of side bands around the optical signal wavelength. And, because if the absolute value of D$_n$ is at least 2 ps/nm/km in each section the occurrence of nonlinear optical phenomena is suppressed and if the absolute value of D$_n$ is not greater than 20 ps/nm/km in each section the interaction of cumulative chromatic dispersion and nonlinear optical phenomena is suppressed, the upper limit value of R is 10.

Table 1 shows Dmax (ps/nm/km), Dmin (ps/nm/km), R and transmission characteristics for each of five different optical fiber transmission-lines A through E.

TABLE 1

|  | D max | D min | R | Transmission Characteristics |
|---|---|---|---|---|
| Waveguide A | 10 | 2 | 5 | ○ |
| Waveguide B | 20 | 2 | 10 | ○ |
| Waveguide C | 2.4 | 1.8 | 1.3 | ○ |
| Waveguide D | 2.0 | 1.8 | 1.1 | X |
| Waveguide E | Each absolute value is identical. | | | X |

As shown in this table, in the optical fiber transmission-line A, Dmax was 10 ps/nm/km, Dmin was 2 ps/nm/km, and R was 5, and there was no formation of side bands. In the optical fiber transmission-line B, Dmax was 20ps/nm/km, Dmin was 2 ps/nm/km, and R was 10, and there was no formation of side bands. In the optical fiber transmission-line C, Dmax was 2.4 ps/nm/km, Dmin was 1.8 ps/nm/km, and R was 1.3, and there was no formation of side bands. However, in the optical fiber transmission-line D, in which Dmax was 2.0 ps/nm/km, Dmin was 1.8 ps/nm/km, and R was 1.1, side bands formed and the transmission characteristics deteriorated. And also in the optical fiber transmission-line E, in which the absolute value of $D_n$ was the same in all the sections and R was 1.0, side bands formed and the transmission characteristics deteriorated.

Thus, in this preferred embodiment, as a result of R being between 1.3 and 10.0, the formation of side bands around the optical signal wavelength can be suppressed and good transmission quality can be obtained.

In this preferred embodiment, the length $L_n$ of each of the sections $4_n$ is preferably at least 0.1 km and not more than 10 km, and in this case, because the cumulative chromatic dispersion does not become large, transmission quality deterioration caused by interaction between cumulative chromatic dispersion and nonlinear optical phenomena can be suppressed. The absolute value of $D_n$ is preferably at least 1 ps/nm/km, and in this case transmission quality deterioration caused by nonlinear optical phenomena can be suppressed. The absolute value of the average chromatic dispersion of the whole repeater span is preferably not greater than 0.5 ps/nm/km, and in this case transmission quality deterioration caused by cumulative chromatic dispersion can be suppressed. The polarization mode dispersion of the whole repeater span is preferably not greater than 0.2 ps/km$^{1/2}$, and in this case transmission quality deterioration caused by polarization mode dispersion can be suppressed. The transmission loss of the whole repeater span is preferably not greater than 0.3 dB/km, and in this case transmission distances without repeater can be made long. And the effective core area is preferably 20 $\mu$m$^2$ or more over the whole repeater span; in this case, transmission quality deterioration caused by nonlinear optical phenomena can be suppressed.

(Second Preferred Embodiment)

Next, a second preferred embodiment of an optical fiber transmission-line according to the invention will be described. The construction of this second preferred embodiment is the same as that shown in FIG. 1.

It is a characteristic feature of this preferred embodiment that the number of sections of which the absolute value of the average chromatic dispersion differs by not less than 10% from that of an adjacent section is at least half of the total number N. That is, among the N sections $4_1$ through $4_N$ in the repeater span, the number of sections of which the absolute value of $D_n$ differs by at least 10% from the absolute value of $D_{n-1}$ or the absolute value of $D_{n+1}$ is at least N/2.

Table 2 shows chromatic dispersions $D_n$ (units: ps/nm/km) in each of two different optical fiber transmission-lines F and G.

TABLE 2

| n | 1 | 2 | 3 | 4 | 5 | 6 | 7 | 8 | 9 | 10 |
|---|---|---|---|---|---|---|---|---|---|---|
| chromatic dispersions $D_n$ of Waveguide F | +11 | −10 | +8 | −8 | +6 | −6 | +4 | −4 | +2 | −3 |
| chromatic dispersions $D_n$ of Waveguide G | +5 | −5 | +3 | −3 | +2.5 | −2.5 | +2 | −2.5 | +2.5 | −2 |

As shown in this table, in both of the optical fiber transmission-lines F and G, the number of sections of which the absolute value of the average chromatic dispersion differs by at least 10% from that of an adjacent section is at least half of the overall number N (=10), and even when carrying out high-speed signal transmission it is possible to suppress the formation of side bands around the optical signal wavelength and good transmission quality can be obtained.

In this preferred embodiment also, all of the lengths $L_n$ are preferably at least 0.1 km and not more than 10 km; the absolute value of every $D_n$ is preferably at least 1 ps/nm/km; the absolute value of the average chromatic dispersion of the whole repeater span is preferably not greater than 0.5 ps/nm/km; the polarization mode dispersion of the whole repeater span is preferably not greater than 0.2 ps/km$^{1/2}$, the transmission loss of the whole repeater span is preferably not greater than 0.3 dB/km; and the effective core area is preferably 20 $\mu$m$^2$ or more over the whole repeater span.

(Third Preferred Embodiment)

A third preferred embodiment of an optical fiber transmission-line according to the invention will now be described. The construction of the optical fiber transmission-line of this third preferred embodiment is also the same as that shown in FIG. 1.

It is a characteristic feature of this preferred embodiment that the number of sections of which the absolute value of the average chromatic dispersion differs by at least 0.5 ps/nm/km from that of an adjacent section is at least half of the total number of sections. That is, among the N sections $4_1$ through $4_N$ in the repeater span, the number of sections of which the absolute value of $D_N$ differs by at least 0.5 ps/nm/km from the absolute value of $D_{n-1}$ or the absolute value of $D_{n+1}$ is at least N/2.

Table 3 shows chromatic dispersions Dn (units: ps/nm/km) in an optical fiber transmission-line H.

TABLE 3

| n | 1 | 2 | 3 | 4 | 5 | 6 | 7 | 8 | 9 | 10 |
|---|---|---|---|---|---|---|---|---|---|---|
| chromatic dispersions $D_n$ of Waveguide H | +8 | −8 | +7.5 | −7.5 | +8.3 | −6.0 | +5.0 | −7.3 | +3.0 | −3.0 |

As shown in this table, in the optical fiber transmission-line H, the number of sections of which the absolute value of the average chromatic dispersion differs by at least 0.5 ps/nm/km from that of an adjacent section is at least half of the overall number of sections N (=10), and even when carrying out high-speed signal transmission it is possible to suppress the formation of side bands around the optical signal wavelength and good transmission quality can be obtained.

In this preferred embodiment also, all of the lengths $L_n$ are preferably at least 0.1 km and not more than 10 km; the absolute value of every $D_n$ is preferably at least 1 ps/nm/km; the absolute value of the average chromatic dispersion of the whole repeater span is preferably not greater than 0.5 ps/nm/km; the polarization mode dispersion of the whole repeater span is preferably not greater than 0.2 ps/km$^{1/2}$; the transmission loss of the whole repeater span is preferably not greater than 0.3 dB/km; and the effective core area is preferably 20 $\mu$m$^2$ or more over the whole repeater span.

(Fourth Preferred Embodiment)

Figure 2:
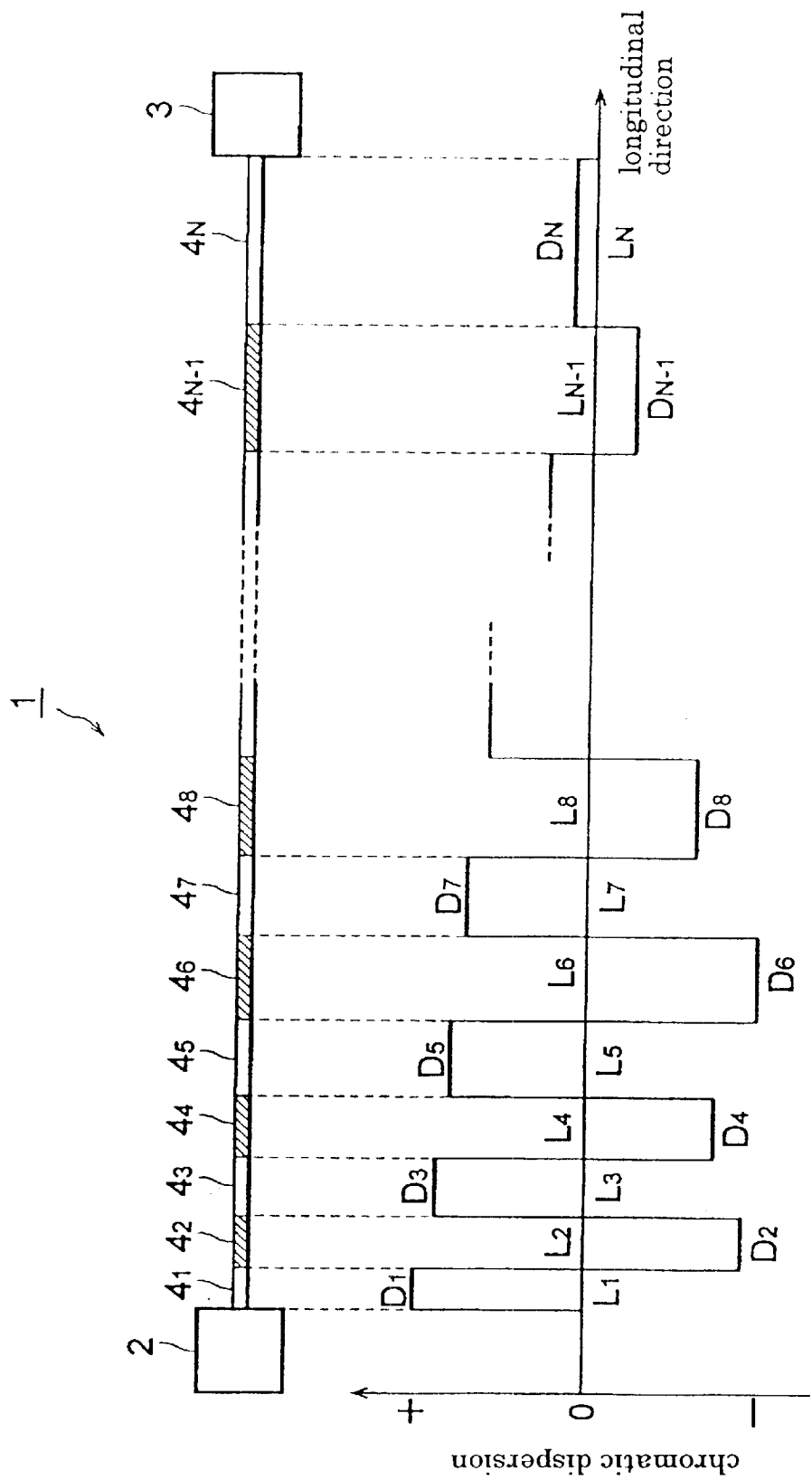
FIG. 2 is a schematic view illustrating an optical fiber transmission-line according to a fourth preferred embodiment.

Next, a fourth preferred embodiment of an optical fiber transmission-line according to the invention will be described. FIG. 2 is a schematic view of an optical fiber transmission-line according to this fourth preferred embodiment. This optical fiber transmission-line 1 constitutes one repeater span installed between a transmitter (or repeater) 2 and a receiver (or repeater) 3, and is made up of N(N≧2) sections $4_1$ through $4_N$ in sequence from the transmitter 2 to the receiver 3. At a predetermined wavelength the chromatic dispersion is positive in the sections $4_n$ where the value of n is odd and is negative in the sections $4_n$ where the value of n is even. $D_n$ and $L_n$ are defined in the same way as in the first preferred embodiment.

It is a characteristic feature of this preferred embodiment that for any two sections the absolute value of the average chromatic dispersion of the section nearer the optical signal input end of the repeater span is larger than the absolute value of the average chromatic dispersion of the section nearer the optical signal output end of the repeater span. That is, of any two adjacent sections $4_n$, $4_{n+1}$, the absolute value of the average chromatic dispersion $D_n$ of the section $4_n$ nearer the input end is larger than the absolute value of the average chromatic dispersion $D_{n+1}$ of the section $4_{n+1}$ nearer the output end. It is also a characteristic feature of this preferred embodiment that the absolute value of the average chromatic dispersion $D_N$ of the section $4_N$ at the output end of the repeater span is at least 1 ps/nm/km.

In an optical fiber transmission-line having the chromatic dispersion of its sections set in this way, in sections nearer the transmitter 2, where the power of the optical signal is relatively large as a result of the absolute value of the chromatic dispersion being relatively large, the occurrence of nonlinear optical phenomena is suppressed. In sections nearer the receiver 3, where the power of the optical signal is relatively small, because nonlinear optical phenomena do not readily occur, the absolute value of the chromatic dispersion can be made small and the cumulative chromatic dispersion can thereby also be made small. And, by the absolute value of $D_N$ being made at least 1 ps/nm/km, the occurrence of nonlinear optical phenomena can be suppressed. In this preferred embodiment also, even when carrying out high-speed signal transmission, it is possible to suppress the formation of side bands around the optical signal wavelength and good transmission quality can be obtained.

Also, preferably, for any two sections the length of the section nearer the optical signal input end of the repeater span is shorter than the length of the section nearer the optical signal output end of the repeater span, that is, in any two sections $4_n$ and $4_{n+1}$, $L_n<L_{n+1}$. When this is done, in sections nearer the transmitter 2, as a result of the section length being relatively small, the cumulative chromatic dispersion can be made small. And in sections nearer the receiver 3, as a result of the section length being relatively long, manufacturing productivity can be improved.

In this preferred embodiment also, all of the lengths $L_n$ are preferably at least 0.1 km and not more than 10 km; the absolute value of every $D_n$ is preferably at least 1 ps/nm/km; the absolute value of the average chromatic dispersion of the whole repeater span is preferably not greater than 0.5 ps/nm/km; the polarization mode dispersion of the whole repeater span is preferably not greater than 0.2 ps/km$^{1/2}$; the transmission loss of the whole repeater span is preferably not greater than 0.3 dB/km; and the effective core area is preferably 20 $\mu$m$^2$ or more over the whole repeater span.

(Modification Examples)

Figure 3:
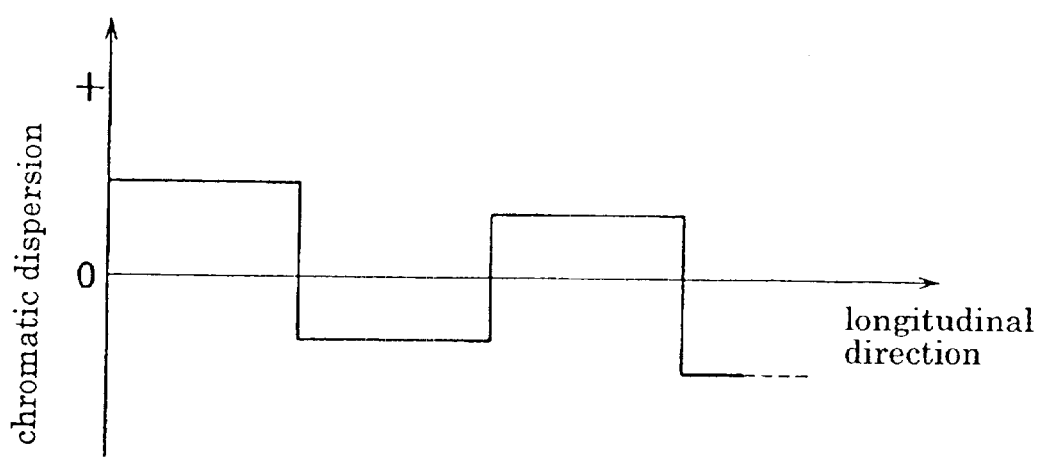
FIG. 3 is a graph illustrating another version of an optical fiber transmission-line according to the invention.
Figure 4:
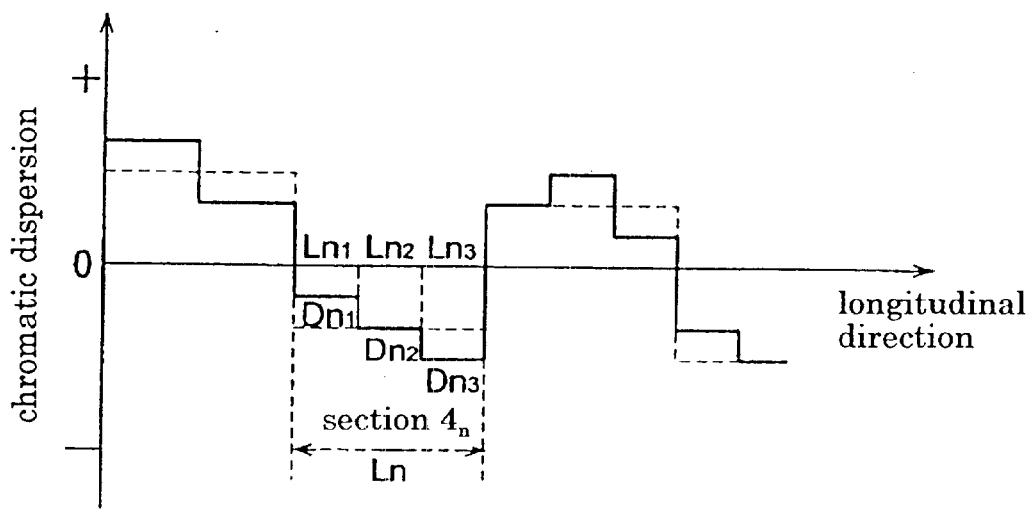
FIG. 4 is a graph illustrating another version of an optical fiber transmission-line according to the invention.
Figure 5:
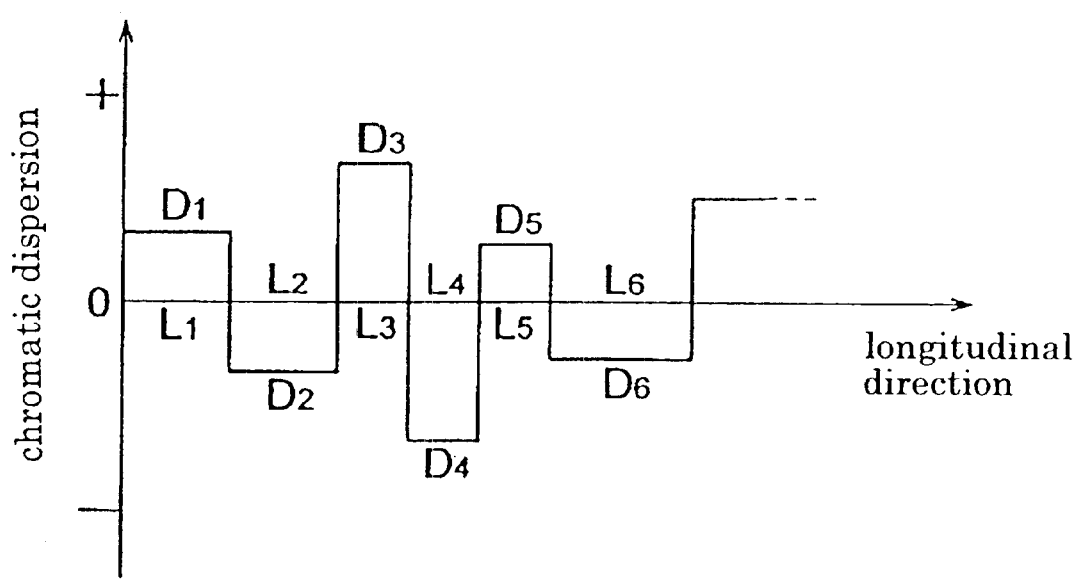
FIG. 5 is a graph illustrating another version of an optical fiber transmission-line according to the invention.

This invention is not limited to the preferred embodiments described above, and these preferred embodiments can be changed in various ways within the scope of the invention. For example, although the chromatic dispersion in each section of the optical fiber transmission-line may be uniform, as shown in FIG. 3, alternatively it may change within the section, as shown in FIG. 4. In this latter case, for example if the sections $4_n$ (of length $L_n$) where the chromatic dispersion is negative, are divided into sub-sections $4_{ni}$ (i=1,2,3) of chromatic dispersion $D_{ni}$ and length $L_{ni}$, the average chromatic dispersion $D_n$ of each such section $4_n$ can be obtained from the formula $D_n=(D_{n1}L_{n1}+D_{n2}L_{n2}+D_{n3}L_{n3})/L_n$. Indeed, provided that the average chromatic dispersion conforms to the provisions of the invention, inside the sections the chromatic dispersion may be changed freely as long as its sign does not change.

Also, preferably, of any two adjacent sections $4_{2m-1}$ and $4_{2m}$ (m=1 to N/2), it is preferable that the relationship $D_{2m-1}L_{2m-1}+D_{2m}L_{2m}=0$ holds. In this case, because the cumulative chromatic dispersion over any two adjacent sections $4_{2m-1}$ and $4_{2m}$ is zero, waveform deterioration is suppressed.

What is claimed is:

1. An optical fiber transmission-line comprising a single repeater span having at least two sections, wherein at a predetermined wavelength the sections successively alternate between positive and negative chromatic dispersion characteristic and the ratio between the maximum value and the minimum value among the absolute values of the average chromatic dispersions of the sections is not less than 1.3 and not greater than 10.0.

2. An optical fiber transmission-line comprising a single repeater span having at least three sections, wherein at a predetermined wavelength the sections successively alternate between positive and negative chromatic dispersion characteristic and the ratio between the maximum value and the minimum value among the absolute values of the average chromatic dispersions of the sections is not less than 1.3 and not greater than 10.0.

3. An optical fiber transmission-line comprising a single repeater span having at least three sections, wherein at a predetermined wavelength the sections successively alternate between positive and negative chromatic dispersion characteristic and the absolute values of the average chromatic dispersions of each section differs by not less than 10% from that of an adjacent section.

4. An optical fiber transmission-line comprising a single repeater span having at least three sections, wherein at a predetermined wavelength the sections successively alternate between positive and negative chromatic dispersion characteristic and the absolute values of the average chromatic dispersions of each section differs by not less than 0.5 ps/nm/km from that of an adjacent section.

* * * * *